United States Patent
Zhou

(10) Patent No.: US 7,606,502 B2
(45) Date of Patent: Oct. 20, 2009

(54) SECOND ORDER PREDISTORTION CIRCUIT

(75) Inventor: Shutong Zhou, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 11/612,784

(22) Filed: Dec. 19, 2006

(65) Prior Publication Data

US 2007/0098414 A1    May 3, 2007

Related U.S. Application Data

(62) Division of application No. 10/244,964, filed on Sep. 17, 2002.

(51) Int. Cl.
H04B 10/04    (2006.01)
(52) U.S. Cl. .................................. 398/193; 398/194
(58) Field of Classification Search ................. 398/193, 398/194; 327/362
See application file for complete search history.

(56) References Cited

U.S. PATENT DOCUMENTS

| | | | |
|---|---|---|---|
| 4,808,810 A | 2/1989 | Van Doorn |
| 4,882,482 A | 11/1989 | Smith et al. |
| 4,992,754 A | 2/1991 | Blauvelt et al. |
| 4,998,012 A | 3/1991 | Kruse |
| 5,119,392 A | 6/1992 | Childs |
| 5,161,044 A | 11/1992 | Nazarathy et al. |
| 5,172,068 A | 12/1992 | Childs |
| 5,321,710 A | 6/1994 | Cornish |
| 5,361,156 A * | 11/1994 | Pidgeon ...................... 398/193 |
| 5,418,637 A | 5/1995 | Kuo |
| 5,424,680 A | 6/1995 | Nazarathy et al. |
| 5,455,705 A | 10/1995 | Gusinov |
| 5,481,389 A | 1/1996 | Pidgeon |
| 5,523,716 A | 6/1996 | Grebliunas et al. |
| 5,568,087 A | 10/1996 | Gatti |
| 5,572,161 A | 11/1996 | Myers |
| 5,589,797 A | 12/1996 | Gans et al. |
| 5,600,472 A * | 2/1997 | Uesaka ...................... 398/158 |
| 5,703,530 A | 12/1997 | Sato et al. |
| 5,752,174 A | 5/1998 | Matai et al. |

(Continued)

FOREIGN PATENT DOCUMENTS

DE    3024533    1/1982

(Continued)

OTHER PUBLICATIONS

Optical Receiver Front-End Nonlinear Distortion, Electronics Letters, Apr. 29, 1982, vol. 18, No. 9, pp. 361-362.

(Continued)

*Primary Examiner*—Quan-Zhen Wang
(74) *Attorney, Agent, or Firm*—Larry T. Cullen

(57) ABSTRACT

A predistortion generator for coupling in-line with a non-linear device produces an output predistortion signal of useful amplitude, but with low composite triple beat and cross modulation distortions. The predistortion circuit comprises a distortion circuit which utilizes the non-linear current flowing through at least one diode, to provide a desired amount of signal attenuation bandwidth. The distortion generator circuitry is always matched to the non-linear device, thereby ensuring a frequency response that is predictable and predefined.

14 Claims, 4 Drawing Sheets

U.S. PATENT DOCUMENTS

| | | | |
|---|---|---|---|
| 5,798,854 A | 8/1998 | Blauvelt et al. | |
| 5,850,305 A | 12/1998 | Pidgeon | |
| 5,909,642 A | 6/1999 | Suzuki | |
| 6,069,534 A | 5/2000 | Kobayashi | |
| 6,107,877 A | 8/2000 | Miguelez et al. | |
| 6,122,085 A | 9/2000 | Bitler | |
| 6,204,718 B1 | 3/2001 | Pidgeon | |
| 2002/0195995 A1* | 12/2002 | Cook et al. | 320/117 |

FOREIGN PATENT DOCUMENTS

| | | |
|---|---|---|
| DE | 3338024 | 5/1985 |
| DE | 0552316 | 2/1992 |
| DE | 4212772 | 10/1993 |
| DE | 2656436 | 6/1998 |
| EP | 0498456 | 2/1992 |
| EP | 0486953 | 5/1992 |
| EP | 0620661 | 10/1994 |
| GB | 1381597 | 1/1975 |
| GB | 2164515 | 3/1996 |
| WO | 9735390 | 9/1997 |

OTHER PUBLICATIONS

Bertelsmeier at al., Linearization of Broadband Optical Transmission Systems, Adaptive Predistortion, 1984, pp. 206-212.

Ohr, GaAs Finds Home In Wireless & High-Speed Data-Communications, Applications, Computer Design, Mar. 1994, pp. 59-68.

Eggers, 2GHz Bandwidth Predistortion Linearizer For Microwave Power Amplifiers At Ku-Band, pp. 1501-1505, Sep. 1994.

Eggers, Pamela—Linearized Solid State Power Amplifier At Ku-band Frequency, pp. 443-445, Sep. 1993.

Khille at al., Semiconductor Transmitter Amplifiers And Traveling Wave Tube Linears For Future Communications Satellites, 8273 ANT Telecommunications Engineering Reports, No. 8, Feb. 1991 (Including English translation).

Locatelli at al., Microwave Linear Power Amplifier With Micromodule Technology, pp. 1.3.1-1.3.6, Jun. 1987.

Kobayashi et al., A Novel Monolithic Linearized HEMT LNA Using HBT Tuneable Active Feedback, Jun. 1996, pp. 1217-1220.

* cited by examiner

SECOND ORDER PREDISTORTION CIRCUIT

This application is a divisional of U.S. Ser. No. 10/244,964, filed on Sep. 17, 2002.

BACKGROUND

The present invention relates generally to communication systems employing amplification devices. More particularly, the invention pertains to a second order predistortion circuit for coupling between an amplifier and a laser transmitter to minimize the second order distortion output by the laser transmitter.

Amplifiers are widely used in many types of communication applications. For certain communication systems, such as optical communication systems, the amplifier is coupled with a laser transmitter, which generates the optical communication signal. As the need for more precise and reliable communication systems increases, it has become imperative to minimize distortions and achieve a linear frequency response.

Directly modulating the analog intensity of a distributed feedback (DFB) laser is widely used to transmit analog signals, (such as sound or video signals and data), on optical fibers over a long distance. Such amplitude modulation signal typically suffers from nonlinearity of the optical source. DFB lasers are limited primarily by second order distortion.

Laser nonlinearities limit the optical modulation depth M that can be used in the laser. Since the carrier-to-noise ratio of the signal is proportional to the square of the optical modulation depth M, by reducing second order distortion products, the optical modulation depth M can be increased, thus greatly improving system dynamic range.

Referring to FIG. 1, a common prior art method of using a standard RF push-pull amplifier to drive a laser transmitter is shown. A signal is input into the RF amplifier 10 which is connected to a laser transmitter via a balun 12. A balun is a type of transmission line transformer (BALanced-UNbalanced) which allows for the transition between a unbalanced circuit and a balanced circuit and permits impedance matching. In FIG. 1, one leg of the balun 12 is connected to ground, while the other leg of the balun is output to the laser transmitter or other predistortion generating circuits. When an RF amplifier is used to drive a laser transmitter as shown in FIG. 1 over a broad frequency range of input signals, the laser output may be distorted in a non-linear fashion over the frequency range. This non-linear distortion, if not corrected, will degrade the signal performance transmitted by the laser as the output becomes less predictable.

Prior art solutions require the use of numerous complex distortion circuits to correct for second and third order distortion over a broad frequency range. Each distortion circuit corrects a limited portion of the broad frequency range to be transmitted by the laser. For example, U.S. Pat. No. 5,523,716 (Grebliunas) discloses an in-line third order predistortion circuit for satellite applications. Because of the different frequency ranges, bandwidths and power ranges, this design is not appropriate for CATV applications. The power in a satellite applications is much greater than for CATV applications. Accordingly, the diodes used in a satellite application need not be biased. In contrast, for CATV applications, the diodes must be forward biased.

U.S. Pat. No. 5,119,392 (Childs) discloses an inline second order predistortion circuit for use with a laser diode. A field effect transistor (FET) biased for square law operation generates the predistortions. Due to field and doping-dependent variations in carrier mobility, the exact exponent N that can be achieved with a FET varies from between 1.0 and 2.7. The deviation of the exponent N from an ideal number, (i.e., 2.0), causes third order distortion. The difficulties in achieving an ideal exponent N equal to 2, and a good RF frequency response across the entire frequency band by using single stage FET amplifiers limits the performance of this predistortion circuit.

Likewise, U.S. Pat. No. 5,600,472 (Uesaka) and U.S. Pat. No. 5,798,854 (Blauvelt et al.) also generally disclose forward bias diodes used for inline second order or third order predistortion circuits.

Most prior art distortion circuits also require complementary temperature correction circuits for proper operation over a wide range of temperatures. However, each predistortion circuit that is introduced creates additional distortions and losses that degrade the overall performance of the laser transmitter.

Accordingly, it is advantageous to minimize the number of pre- or post-distortion circuits which are utilized to correct for the distortion of the RF amplifier and the laser transmitter.

SUMMARY

The present invention is a second order predistortion circuit for coupling between an amplifier and a laser transmitter. The circuit includes a non-linear attenuating circuit which is coupled to a transmission line transformer. The distortion amplifier circuitry is always matched to the laser transmitter, thereby ensuring a frequency response that is predictable and predefined.

Objects and advantages of the of the present invention will become apparent to those skilled in the art after reading a detailed description of the preferred embodiment.

DETAILED DESCRIPTION OF THE PREFERRED EMBODIMENTS

Figure 1:
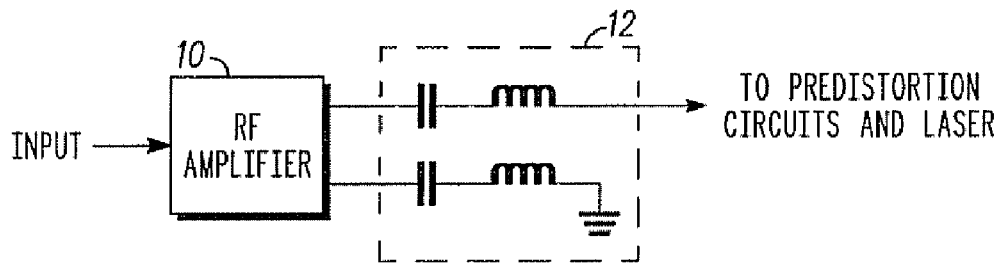
FIG. 1 is a schematic diagram of a prior art circuit comprising an RF amplifier coupled with a laser transmitter.

The preferred embodiment of the present invention will be described with reference to the drawing figures where like numerals represent like elements throughout.

Figure 2:
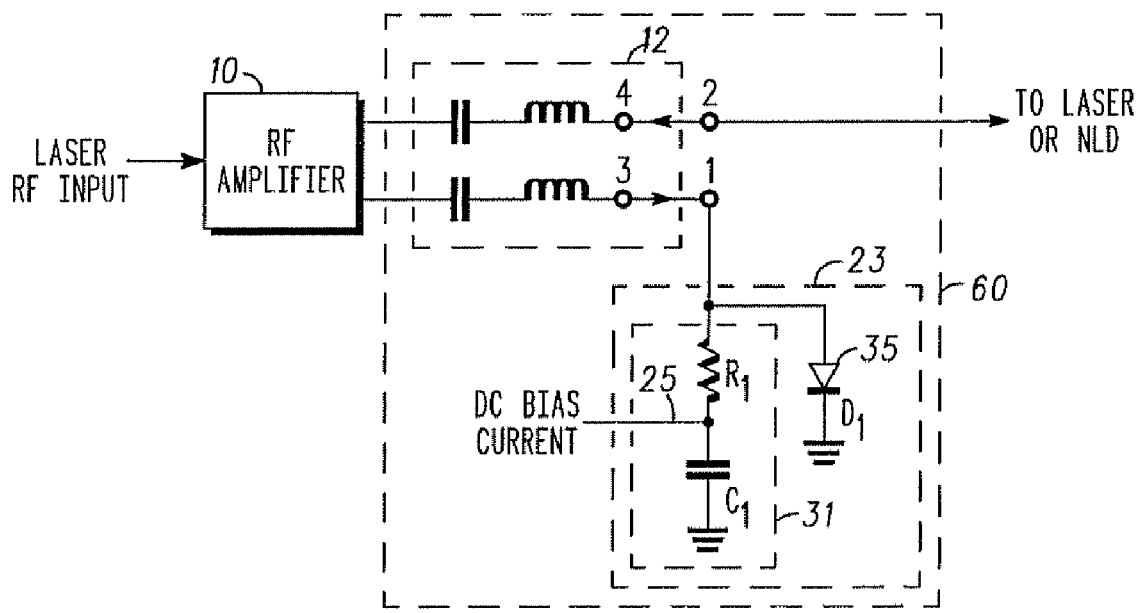
FIG. 2 is a schematic diagram of one embodiment of the distortion amplifier of the present invention having a distortion circuit with a single diode coupled to the ground path of an RF amplifier.

Referring to FIG. 2, the preferred embodiment of a predistortion circuit 60 made in accordance with the present invention is shown. The predistortion circuit 60 is coupled between an RF amplifier 10 and a laser transmission or other non-linear device (NLD) (not shown) and includes a transistor line transformer such as a balun 12 and a distortion Circuit 23.

The balun 12, is coupled between the output of the RF amplifier 10 and a laser transmitter (not shown). The balun 12 provides impedance matching and allows for the transition between the balanced RF amplifier 10 and the unbalanced laser transmitter (not shown). The RF amplifier 10 is preferably a push-pull type amplifier.

The distortion circuit 23 is attached to one leg of the balun 12, between the balun 12 and ground. The distortion circuit 23 comprises a resistor $R_1$, a capacitor $C_1$ and diode $D_1$. A DC bias current is also applied at a DC bias input 25 between the resistor $R_1$ and the capacitor $C_1$.

In any multichannel RF communication environment, the ratio of the peak RF current to the average RF current, (i.e., the peak to average ratio), is dependent upon the number of channels present. Accordingly, the peak to average ratio will change depending upon the number of channels in the system. In a CATV environment, due to the large number of channels, ("typically" 110 channels), the peak to average current ratio is 3 to 1. Of course, those of skill in the art should realize that a CATV environment can have from as few as 30 channels to as many as 132 or more channels. For ease of explanation, the foregoing description will assume a CATV environment of approximately 110 channels.

The values of the components $R_1$, $C_1$ and $D_1$ must be specifically selected so that: 1) approximately one-third to one-half of the RF output current from the RF amplifier 10 flows through the diode $D_1$; and 2) the DC bias current to the diode $D_1$ (which forward-biases the diode $D_1$) is approximately between two to three times the value of the RF current through the diode $D_1$. These current ratios are critical to efficient operation of the distortion circuit 23. If the magnitude of the DC bias current is not approximately three times the magnitude of the RF current, clipping of the signal output to the laser transmitter may result. When the RF current flows in the direction from point 3 to point 1, the balun 12 output current flows in the direction from point 2 to point 4.

In general, the distortion characteristics of the diode $D_1$ are matched to the distortion characteristics of the particular laser transmitter. The distortion circuit 23 creates second order distortions to compensate for the distortions generated by the laser transmitter. The particular internal junction resistance of the diode $D_1$ (i.e., its IV curve), are exploited for matching with the IV curve of the laser transmitter to provide predistortion to the laser transmitter. The amount of RF current through the diode $D_1$ determines the level of distortion output by the distortion circuit 23.

The predistortion circuit 23 basically includes two signal paths; the first signal path 31 comprising the resistor $R_1$ and the capacitor $C_1$; and the second signal path 35 comprising the diode $D_1$. Referring to the first signal path 31, this path 31 basically affects the operating point of the diode $D_1$. The DC bias input 25 provides a DC bias current to forward bias the diode $D_1$. The capacitor $C_1$ acts as a DC block, permitting the DC bias current from the DC bias input 25 to flow up through the first signal path 31 and over to the second signal path 35 to the diode $D_1$. However, since the capacitor $C_1$ is invisible to the RF current, the RF current will be divided between the first signal path 31 and second signal path 35. From an RF point of view, the resistor $R_1$ is in parallel with the diode $D_1$. But from a DC point of view, the resistor $R_1$ and the diode $D_1$ are in series. This forces the DC bias current from the DC bias input 25 through the diode $D_1$ to forward bias the diode $D_1$.

The unique location of the DC bias input 25 provides a significant advantage over other prior art correction circuits. Since the DC bias input 25 is at ground potential, it is essentially self-isolated and does not require any additional measures for decoupling, thereby greatly simplifying the overall circuit design. The DC bias input 25 plays an important role in overall distortion level and frequency response control. Basically, when the bias current is low, low frequencies get more second order correction; whereas a higher bias current provides more correction at higher frequencies. In this manner, the bias current may be controlled for different laser distortion characteristics. Thus, an RF filter that is typically required in the prior art, is not required for the present invention. This eliminates the unwanted negative effects of an RF filter, which can change both the phase and the frequency of the distortion.

It should also be noted that there is a negligible temperature dependency of the circuit. Since the DC bias current is relatively large, (i.e., 5-15 mA), the diode internal junction resistance is very small. This should be compared with prior art circuits having bias current in the microamp range. Therefore, the forward DC diode bias current across $D_1$ is primarily determined by the DC bias current input 25. As a result, the current variation due to the temperature variation is minimal and a separate temperature correction circuit is not necessary. Experimental data shows that when temperature changes from 0-65° C., the correction results change less than 1-2 dB. This is a significant advantage over existing prior art circuits.

Since the diode internal junction resistance is very small, the distortion circuit 23 adds an equivalent additional resistance of approximately 2 ohms. The influence of the distortion circuit 23 upon the operation of the RF amplifier 10 is therefore small.

Since a laser is a square law device, it tends to minimize third order distortion but has a very limited immunity to second order distortion. The predistortion circuit 60 of the present invention can create a correction signal that may be tailored to a particular laser. This predistortion circuit 60 corrects second order distortion while having little effect on third order distortion. The tailoring of the predistortion circuit 60 is accomplished by the selection of the diode $D_1$. Diode internal series resistance and diode internal junction resistance, which are determined by the diode current, determine the diode total resistance which, in turn, determines the amount of current flowing through the diode $D_1$.

There are several technical observations that can be made about the distortion circuit 23 made in accordance with the teachings of the present invention. As the RF current flowing through the diode $D_1$ is increased, the equivalent diode resistance is reduced and the total resistance between point 1 and ground is reduced. This causes the output internal resistance of the predistortion circuit 60 at point 2 to be reduced. As the RF current flowing through the diode $D_1$ is decreased, the output internal resistance of the predistortion circuit 60 at point 2 is increased. This change in resistance creates the second order predistortion needed for the laser transmitter.

For an example, for a Fujitsu laser having a power range from 3-10 mW, the DC current flowing through the diode $D_1$ is 5-16 mA, which is much higher than prior art inline predistortion circuits. For example, the circuit disclosed in U.S. Pat. No. 5,600,472 includes a diode current of between 0 and 400 μA; and the circuit disclosed in U.S. Pat. No. 5,798,854, includes a diode current of 20 μA. Because of the large diode DC current, the amount of diode internal series resistance is also important for present invention, which is not important for the prior art distortion circuit.

Figure 3:
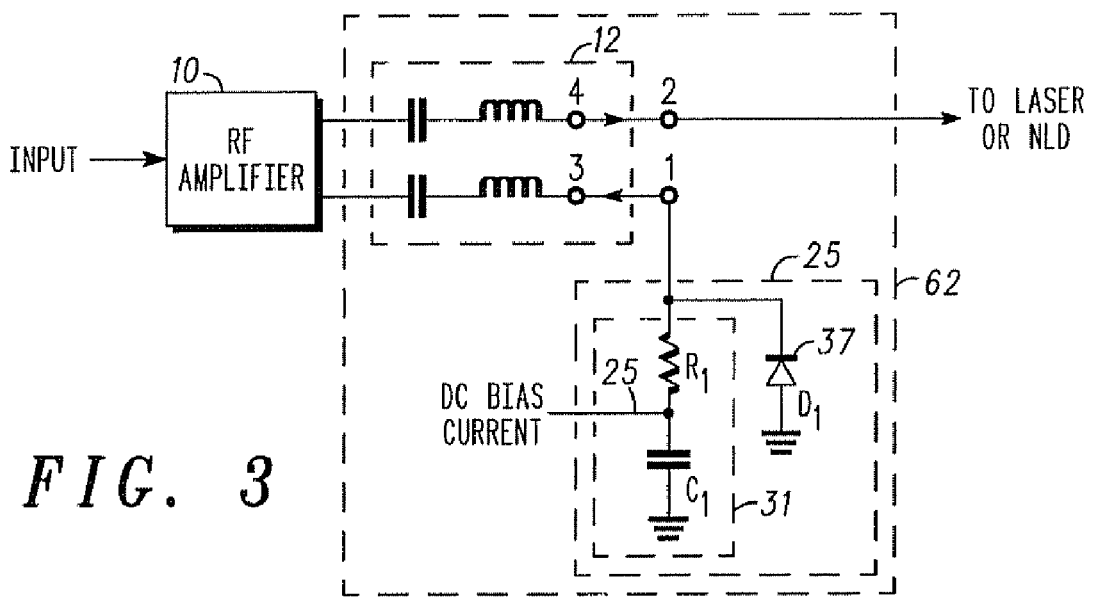
FIG. 3 is a schematic diagram of a first alternative embodiment of the distortion amplifier of the present invention.

An alternative embodiment of a predistortion circuit 62 made in accordance with the teachings of the present invention is shown in FIG. 3. This embodiment differs from the embodiment shown in FIG. 2 only in the polarity of the diode D1. The embodiments shown in FIGS. 2 and 3 generate different second order distortion. However, the goal of a simplified second order distortion generation can be achieved utilizing either of these configurations.

Figure 4:
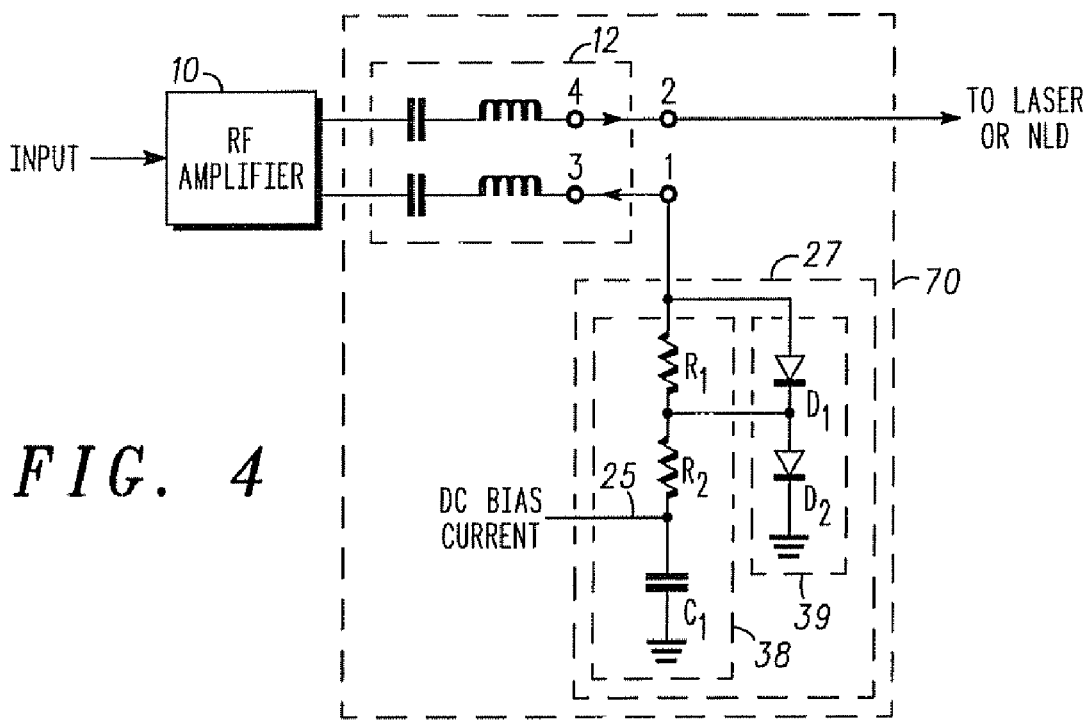
FIGS. 4 and 5 are schematic diagrams of second and third alternative embodiments of the distortion amplifier of the present invention having distortion circuits with two series-coupled diodes.
Figure 5:
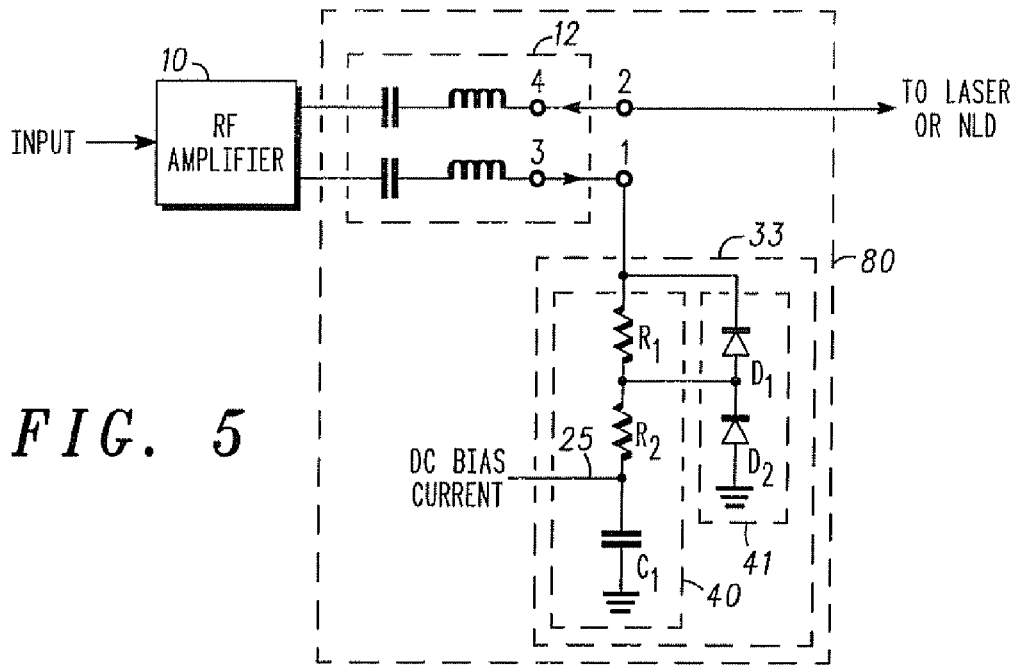

As a laser transmitter optical output power becomes larger, it typically requires more RF drive power and more DC drive current, resulting in Schottky diodes which require more DC bias drive current. Referring to FIGS. 4 and 5, two additional alternative embodiments of predistortion circuits 70, 80 made in accordance with the present invention are shown. These embodiments are utilized for applications where higher output powers are required than can be achieved utilizing a single diode.

As shown in FIG. 4, the predistortion circuit 70 includes a balun 12 and a distortion circuit 27. The predistortion circuit 27 is attached one leg of the balun 12, between the balun 12 and ground. The distortion circuit 27 includes two resistors $R_1$, $R_2$, a capacitor $C_1$ and two diodes $D_1$, $D_2$. A DC bias current is applied at a DC bias input 25 between the resistor $R_2$ and the capacitor $C_1$. The distortion circuit 27 includes a first signal path 38 and a second signal path 39. The first signal path comprises resistors $R_1$, $R_2$, DC bias input 25 and capacitor $C_1$ in series. The second signal path 39 comprises diodes $D_1$ and $D_2$ in series. The two diode/resistor pairs (i.e., $D_1/R_1$ and $D_2/R_2$), are coupled in series in order to achieve greater output powers from the distortion circuit 27.

The predistortion circuit 80 shown in FIG. 5 includes a balun 12 and a distortion circuit 33. The distortion circuit 33 is attached to one leg of balun 12, between the balun and ground. The distortion circuit 33 comprises two resistors $R_1$, $R_2$, a capacitor $C_1$ and two diodes $D_1$, $D_2$. A DC bias current is applied at a DC bias input 25 between the resistor $R_2$ and the capacitor $C_1$. The distortion circuit 33 includes a first signal path 40 and a second signal path 41. The first signal path 40 comprises resistors $R_1$ and $R_2$, DC bias current input 25 and capacitor $C_1$ in series. The second signal path 41 comprises diodes in series. This predistortion circuit 33 operates in the same manner as the distortion circuit 27 shown in FIG. 4 except that a different response characteristic is achieved due to the reverse polarity of the diodes $D_1$, $D_2$.

Figure 6:
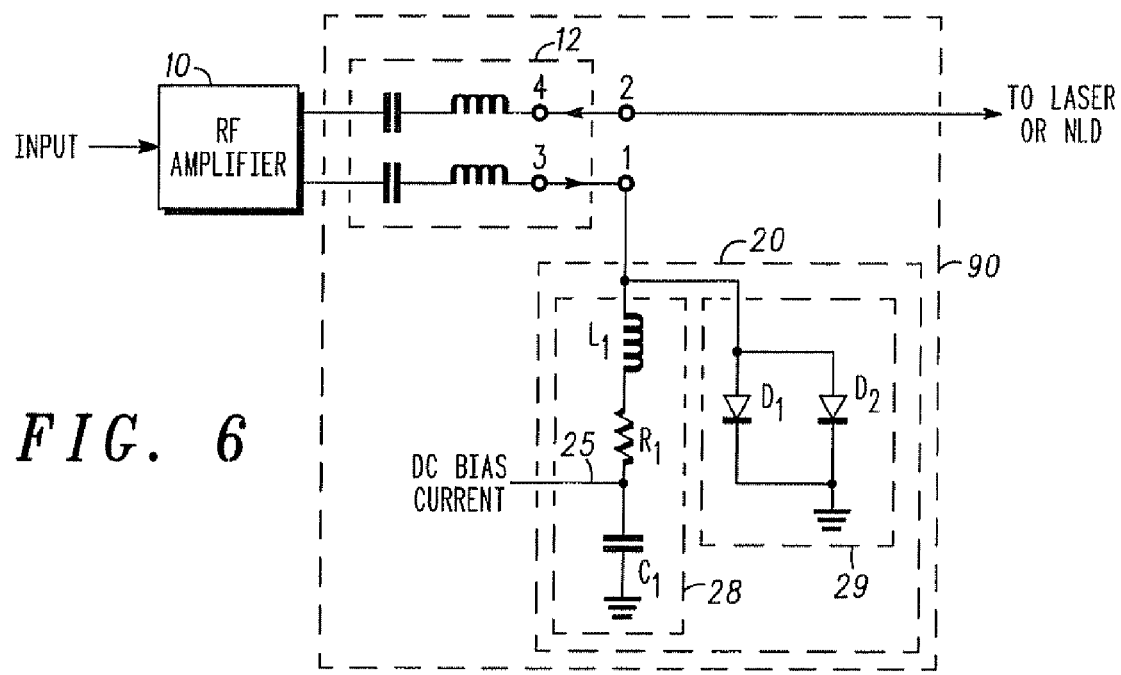
FIGS. 6 and 7 are schematic diagrams of fourth and fifth alternative embodiments of the distortion amplifier of the present invention having distortion circuits with two parallel-coupled diodes.

Referring to FIG. 6, an alternative embodiment of the predistortion circuit 90 of the present invention is shown. The predistortion circuit 90 is coupled to a laser transmitter (not shown). The distortion amplifier 90 includes a balun 12 and a distortion circuit 20. The distortion circuit 20 is attached to one leg of the balun 12, between the balun 12 and ground. The distortion circuit 20 comprises an inductor $L_1$, a resistor $R_1$, a capacitor $C_1$, and two diodes, $D_1$, $D_2$. A DC bias current is also applied at a DC bias input 25 between the resistor $R_1$ and the capacitor $C_1$.

The distortion circuit 20 of this embodiment includes two signal paths 28, 29, and operates upon the same physical principals as were discussed with reference to FIGS. 2, 3, 4 and 5. However, this embodiment includes an inductor $L_1$ in the first signal path 28 and includes parallel-coupled diodes $D_1$ and $D_2$ in the second signal path. The inductor $L_1$ improves the frequency response of the distortion circuit 20 over the entire frequency bandwidth and optimizes the frequency response of the distortion circuit 20.

The parallel-coupled diodes $D_1$, $D_2$ present a unique solution for RF current distribution between the two signal paths. By coupling diodes $D_1$ and $D_2$ in parallel, it is possible to obtain an equivalent diode internal series resistance. Since, in most cases, diode internal series resistance is determined during the manufacturing process of the diodes and cannot be changed by a user, selecting a unique combination of two different types of diodes $D_1$ and $D_2$, it is possible to obtain the equivalent diode internal series resistance that is required for matching with the laser transmitter. For the embodiment shown in FIG. 6, the two diodes $D_1$, $D_2$ have been combined to form a new equivalent diode, which has the specific equivalent diode internal series resistance that is desired.

The inductance $L_1$ is used to raise the second order correction ability of the circuit in the higher frequency ranges. The inductor $L_1$ helps the RF response of the distortion circuit 20 across the entire frequency bandwidth. Without the inductor $L_1$, the PR response of the distortion circuit 20 would essentially be flat. The inductor $L_1$ tilts the frequency response of the distortion circuit 20 such that a greater amount of distortion is provided at higher frequencies, where it is most needed. This permits the distortion circuit 20 to better match the distortion of the laser transmitter across the entire frequency bandwidth.

Figure 7:
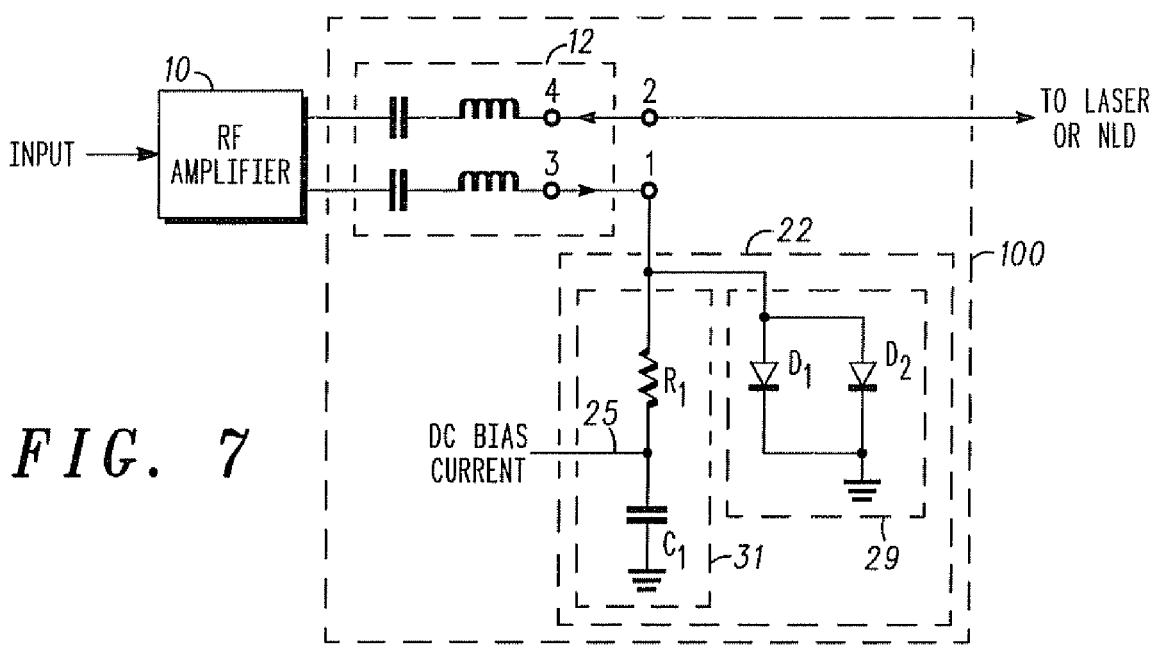

Referring to FIG. 7, an alternative embodiment of a predistortion circuit 100 made in accordance with the present invention is shown. This embodiment is similar to the embodiment shown in FIG. 6, except that the first signal path 31 does not include the inductor $L_1$. Although the inductor $L_1$ improves the frequency response over the entire frequency bandwidth and optimizes the frequency response of the distortion circuit 20, it is not necessary for operation. Accordingly, this embodiment of the distortion circuit 22 is slightly less complicated than that shown in FIG. 6.

Table 1 shows the specifications for the components in the embodiments described hereinbefore. Those of skill in the art should recognize that the specific components will change depending upon the response desired. This depends upon the type of RF amplifier 10, the balun 12, the laser transmitter (not shown) and/or other circuits or NLDs (not shown) to which the predistortion circuit of the present invention is coupled.

TABLE 1

| COMPONENT | SPECIFICATIONS |
|---|---|
| $C_1$ | 0.1 microfarad |
| $D_1$ | Hewlett-Packard HSMS-2822 |
| $D_2$ | Alpha Industries SMS 7621 Schottky |
| $L_1$ | 1.5 nano Henries |
| $R_1$ | 3 ohms |
| Bias Control | 15 milliamp |
| Amplifier | Analogic ACA 0860 |

As shown and described, the present invention: a) reduces the number of second order distortion generating circuits to a single second order distortion generating circuit operating over a very wide frequency bandwidth (55-860 MHz and greater); b) eliminates or minimizes the need for additional temperature compensation circuitry thereby making the distortion circuit temperature independent; c) has limited impact upon the signal to be transmitted with respect to third order distortion, thereby simplifying any third order distortion generating circuit that may be needed; and d) due to its simplicity, it occupies significantly smaller silicon surface area when implemented than the prior art distortion generating circuits.

Utilizing the present invention, the CSO correction ability can be quite large. Usually it can correct about 10 dB across the 55-750 MHz frequency band The largest CSO correction ability is −55 dBc. In this case, the worse case CSO at −55 dBc can be corrected to better than −65 dBc across the 55-860 MHz frequency band.

By eliminating the prior art need for multiple second order distortion circuits and their associated multiple temperature compensation circuits, the present invention will permit significantly smaller and cheaper laser transmitters. Utilizing the present invention, for example, will permit a doubling in the number of laser transmitters and the same amount of module space.

It should also be noted that any of the embodiments of the predistortion circuit in accordance with the present invention may be coupled together with an RF amplifier as a single unit to create an RF distortion amplifier. All of the teachings herein are equally applicable to such a configuration.

Figure 8:
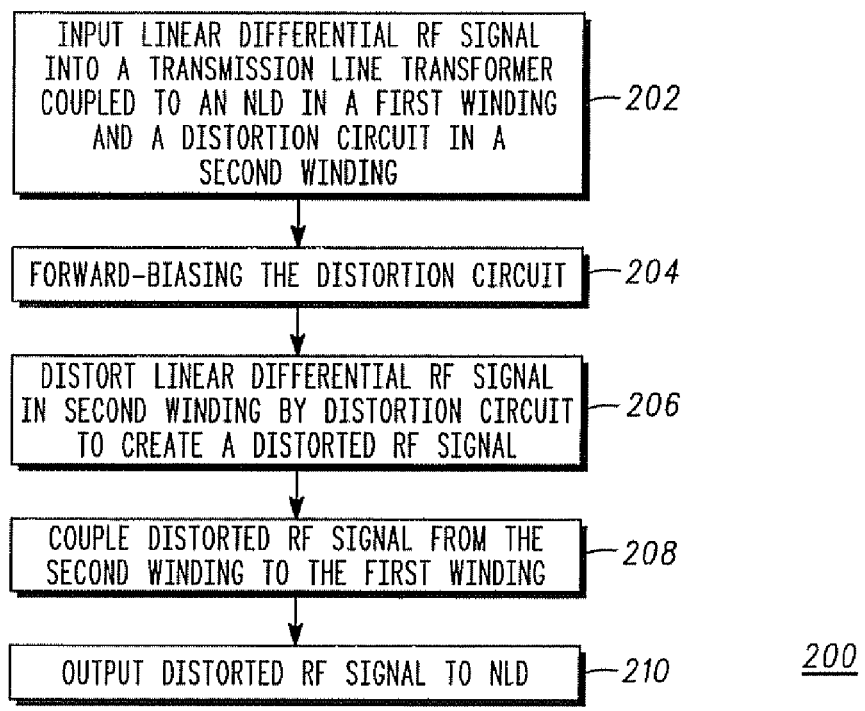
FIG. 8 is the preferred method in accordance with the present invention.

Referring to FIG. 8, the preferred method 200 of generating a distorted RF signal in accordance with the present invention is shown. The method is initiated when a linear differential RF signal is input into a transmission line transformer (step 202). It should be understood that the transmission line transformer is coupled to an NLD in a first winding and a distortion circuit in a second winding. The distortion circuit is then forward-bias, as desired, (step 204) and the linear differential RF signal that is input is distorted by the distortion circuit to create a distorted RF signal (step 206). The distorted RF signal is then coupled from the second winding to the first winding (step 208) and then output to the NLD (step 210).

What is claimed is:

1. A distortion amplifier for generating a selectively distorted RF signal, including an RF amplifier and a distortion circuit; the distortion circuit consists of:
   a first signal path, for conducting both RF and DC bias current, including at least one nonlinear device;
   a second signal path, for conducting both RF and DC bias current, coupled in parallel to said first signal path with respect to RF current, coupled in series to said first signal path with respect to DC bias current, and including at least one resistance means; and
   a DC bias current input for providing said DC bias current to said first and second paths
   wherein approximately one-third to one-half of the current output from the RF amplifier flows through said first path, and
   wherein the nonlinear device in the first signal path is the sole nonlinear device affecting the level of distortion output by said distortion circuit.

2. The distortion amplifier of claim 1, wherein the amount of DC bias current which flows through said first path is approximately between two to three times the amount of said RF current.

3. The distortion amplifier of claim 1, wherein said nonlinear device is coupled directly to ground.

4. The distortion amplifier of claim 1, wherein said diode is coupled directly to ground.

5. The distortion amplifier of claim 1, wherein said first signal path includes a first diode and a second diode coupled in series.

6. The distortion amplifier of claim 1, wherein said first signal path includes a first diode and a second diode coupled in parallel, and said second signal path includes a resistor and an inductor coupled in series.

7. The distortion amplifier of claim 1, further comprising a balun transformer coupled to said RF amplifier,
   wherein a common connection point coupling said first signal path and said second signal path is coupled directly to a first leg of said balun transformer.

8. The distortion amplifier of claim 1, wherein said DC bias current input is at ground potential.

9. A distortion control circuit coupled between an RF amplifier and a laser transmitter for selective modulation of the RF signal output from the RF amplifier, said distortion control circuit consists of:
   a first signal path comprising a non-linear circuit having at least one diode;
   a second signal path comprising a DC bias current input coupled with a capacitor;
   wherein said first and second signal paths are coupled in parallel between said RF amplifier and ground,
   wherein the RF current from the RF signal flows through both said first signal path and said second signal path, and wherein between approximately one-third to one-half of the RF current flows through said first signal path, and
   wherein the nonlinear circuit in the first signal path is the sole nonlinear circuit affecting the level of distortion output by said distortion control circuit.

10. The distortion control circuit of claim 9, wherein the DC bias current through said first signal path is approximately between two to three times said RF current through said first signal path.

11. The distortion control circuit of claim 9, wherein said first signal path includes a first diode and a second diode coupled in series.

12. The distortion control circuit of claim 9, wherein said first signal path includes a first diode and a second diode coupled in parallel, and said second signal path includes a resistor and an inductor coupled in series.

13. The distortion control circuit of claim 9, further comprising a balun transformer coupled to said RF amplifier,
   wherein a common connection point coupling said first signal path and said second signal path is coupled directly to a first leg of said balun transformer.

14. The distortion control circuit of claim 9, wherein said DC bias current input is at ground potential.

* * * * *